US010127095B2

(12) United States Patent
Lai et al.

(10) Patent No.: US 10,127,095 B2
(45) Date of Patent: Nov. 13, 2018

(54) SEAMLESS AUTOMATIC RECOVERY OF A SWITCH DEVICE

(71) Applicant: Quanta Computer Inc., Taoyuan (TW)

(72) Inventors: Te-Hsien Lai, Taoyuan (TW);
Ying-Chin Huang, Taoyuan (TW);
Nien-Ching Chen, Taoyuan (TW);
Pi-Yueh Tsai, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 163 days.

(21) Appl. No.: 14/932,352

(22) Filed: Nov. 4, 2015

(65) Prior Publication Data

US 2017/0123884 A1    May 4, 2017

(51) Int. Cl.
*G06F 11/00* (2006.01)
*G06F 11/07* (2006.01)

(52) U.S. Cl.
CPC ........ *G06F 11/0757* (2013.01); *G06F 11/079* (2013.01); *G06F 11/0721* (2013.01); *G06F 11/0793* (2013.01)

(58) Field of Classification Search
CPC .................................................. G06F 11/1441
See application file for complete search history.

(56) References Cited

U.S. PATENT DOCUMENTS

| | | | | |
|---|---|---|---|---|
| 7,774,648 B2 * | 8/2010 | Majewski | ........... | G06F 11/0757 714/23 |
| 8,677,185 B2 * | 3/2014 | Sawaguchi | ......... | G06F 11/0721 714/37 |
| 2003/0061544 A1 * | 3/2003 | Maier | ................ | G06F 11/3648 714/39 |
| 2003/0204792 A1 * | 10/2003 | Cahill | ................ | G06F 11/0757 714/55 |
| 2004/0003317 A1 * | 1/2004 | Kwatra | ............... | G06F 11/0748 714/25 |
| 2004/0034816 A1 * | 2/2004 | Richard | .............. | G06F 11/1441 714/39 |
| 2005/0188274 A1 * | 8/2005 | Vedam | ................ | G06F 11/0757 714/39 |

(Continued)

FOREIGN PATENT DOCUMENTS

| | | | | |
|---|---|---|---|---|
| CN | 101271414 A | * | 9/2008 | ............. G06F 11/00 |
| TW | 295009 I | | 3/2008 | |
| TW | 201241607 A1 | | 10/2012 | |

OTHER PUBLICATIONS

Full Range Dog Feeding Method of Embedded System. Translation From Chinese Patent CN 101271414.*

(Continued)

*Primary Examiner* — Amine Riad
(74) *Attorney, Agent, or Firm* — Nixon Peabody LLP; Eduardo J. Quiñones

(57) ABSTRACT

Embodiments generally relate to automatic recovery of a computing system. The present technology discloses techniques that can enable an automatic detection and recovery of a switch device from system malfunctions. According to some embodiments, a watchdog timer can detect switch system malfunctions and send out signals to reset a switch central processor unit. According to some embodiments, the switching functions can be maintained during a reset of the switch central processor unit.

20 Claims, 6 Drawing Sheets

(56) References Cited

U.S. PATENT DOCUMENTS

| | | | |
|---|---|---|---|
| 2008/0005626 A1* | 1/2008 | Schaff | G06F 1/3203 |
| | | | 714/48 |
| 2008/0229158 A1* | 9/2008 | Saito | G06F 11/1417 |
| | | | 714/55 |
| 2010/0146252 A1* | 6/2010 | Chang | G06F 1/24 |
| | | | 713/1 |
| 2012/0260076 A1 | 10/2012 | Liu et al. | |
| 2014/0325274 A1* | 10/2014 | Mueller | G06F 11/1441 |
| | | | 714/23 |
| 2017/0010933 A1* | 1/2017 | Wang | G06F 11/0736 |

OTHER PUBLICATIONS

Taiwanese Search Report 104143999 dated Oct. 26, 2016 w/ First Office Action Summary.

\* cited by examiner

SEAMLESS AUTOMATIC RECOVERY OF A SWITCH DEVICE

FIELD OF THE DISCLOSURE

The disclosure relates generally to automatic recovery of a computing system. More specifically, certain embodiments of the technology relate to a method and system for automatic recovery of a switch device with high-availability of switching functions.

BACKGROUND

A network switch is a computer comprising a number of components connected by a system bus. Each network switch may include a plurality of ports that couple the switch to other network devices over a network interface, such as Ethernet.

A network switch provides switching functions for transferring information, such as packets or data frames, between network-connected devices. The switching functions provided by the switch typically includes receiving data at a source port from a network device, transferring the data over a backplane to at least one other destination port, and transmitting data to another device of the network.

However, it remains challenging to automatically detect and recover a network switch from system malfunctions. For example, when a switch central processor unit (CPU) hangs, a cold boot initialization is typically used to recover the switch from a lock-up state in which the CPU ceases to respond to inputs. However, the cold boot initiation process often takes relatively long time and thus reduces the system efficiency.

SUMMARY

Aspects of the present technology relate to techniques that enable an automatic detection and recovery of a switch device from system malfunctions. Aspects of the present technology also relate to technology that allows a switch device to recover from system malfunction without hampering the switching functions.

According to some embodiments, a network switch can include a switch CPU and an application-specific integrated circuit (ASIC). The present technology can utilize a watchdog timer to monitor and detect switch system malfunctions such as a switch CPU hang or lock-up. In response to a CPU lock-up, the watchdog timer can send out signals to reset the CPU. As multiple watchdog timer counters can be configured, the watchdog timer can detect and recover system malfunctions at different stages of a system operation.

According to some embodiments, a watchdog timer can be an electronic timer that is embedded in a switch CPU. According to some embodiments, a watchdog timer can be an independent service controller such as a baseboard service controller (BMC), which can implement watchdog timer functions as disclosed herein. According to some embodiments, the present technology can enable a rack management controller (RMC) or a chassis management controller (CMC) to provide watchdog timer functions.

According to some embodiments, the present technology relate to a computer-implemented method of booting a switch central processor unit, comprising: First, setting a first watchdog timer counter of a watchdog timer, the first watchdog timer counter being associated with a boot loader stage, the watchdog timer being operable to reset a switch central processor unit after expiration of the first watch dog timer counter; second, setting a second watchdog timer counter of the watchdog timer, the second watchdog timer counter being associated with an operation system booting stage, the watchdog timer being operable to reset the switch central processor unit after expiration of the second watch dog timer counter; and third, setting a third watchdog counter of the watchdog timer, the third watchdog timer counter being associated with a runtime stage, the watchdog timer being operable to reset the switch central processor unit after expiration of the third watch dog timer counter.

According to some embodiments, a reset of the network system can further include a warm boot initialization of an application-specific integrated circuit (ASIC). Unlike a cold boot initiation process that can cause network downtime, a warm boot initiation process can reserve the switching function during a CPU reset. For example, switching functions such as learning and forwarding can continue during a CPU reset. As such, the warm boot initiation can reserve the efficiency of switching functions.

According to some embodiments, although many of the examples herein are described with reference to Ethernet switches, it should be understood that these are only examples and the present technology is not limited in this regard. Rather, any switches that provide network connections for computers may be used, such as fibre channel switches, asynchronous transfer mode switches, and Infini-Band switches, or the like.

Additionally, even though the present discussion uses a BMC as examples of a service controller, the present technology is applicable to other service controller that is independent from the main CPU and operation system.

Additional features and advantages of the disclosure will be set forth in the description which follows, and, in part, will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

BRIEF DESCRIPTION OF THE DRAWINGS

Various embodiments or examples ("examples") of the invention are disclosed in the following detailed description and the accompanying drawings.

DETAILED DESCRIPTION

Various embodiments of the present technology are discussed in detail below. While specific implementations are discussed, it should be understood that this is done for illustration purposes only. A person skilled in the relevant art will recognize that other components and configurations may be used without departing from the spirit and scope of the present technology.

As backbones of modern information technology, network switches enable multiple computing devices to transmit data via a network interface such as Ethernet. The growing networking demand, particularly in a clustered computing environment such as large data centers, requires network switches to provide switching functions with high availability and excellent reliability.

A network switch typically includes a central processing unit (CPU) and an application-specific integrated circuit (ASIC) that is operable to provide the data switching function. Conventionally, a cold boot initialization is typically used to recover a switch from a CPU lock-up, in which the CPU ceases to respond to inputs. The cold boot initiation process often takes relatively long time for the switch to recover and, therefore, results in low-availability of the switching functions.

Thus, there is a need to improve the network switch protocol for providing an automatic detection and recovery of a switch system malfunction. Further, it is desirable to recover the network switch without hampering switching functions.

The present technology discloses techniques that can enable an automatic detection and recovery of a switch system malfunction using a watchdog timer. According to some embodiments, the present technology can utilize a watchdog timer that is embedded and internal to a switch CPU to provide the watchdog functions disclosed herein; according to some embodiments, the present technology can utilize a service controller that is external to a switch CPU to provide the watchdog functions disclosed herein. According to some embodiments, the present technology can enable a seamless recovery of the network switch without diminishing the switching functions such as learning, flooding and forwarding of data frames.

A watchdog timer can be an electronic timer that is used to detect and recover from system malfunction. A watchdog timer is often based on a counter that can count from an initial value to zero, which can trigger a system reset. When the system operation is normal, the system can, automatically and periodically, reset the counter so that it would not expire and initiate the system reset. Conversely, when the system has anomalies and fails to reset the counter, the watchdog counter, at the expiration of the counter, can send a timeout signal to reset the system for restoring normal system operation.

Figure 1A:
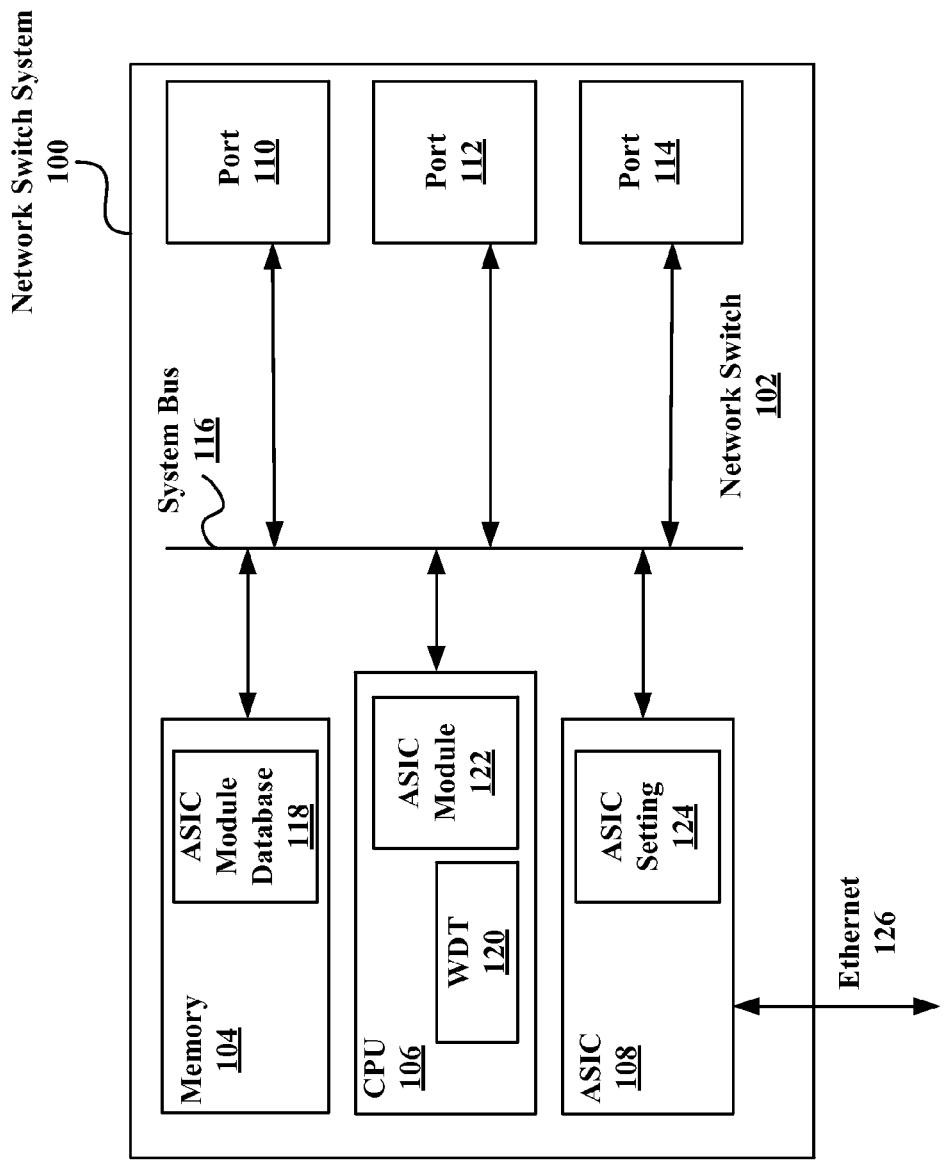
FIG. 1A is a schematic block diagram illustrating an example of an automatic-recovery switch system with an internal watchdog timer, according to some embodiments.

FIG. 1A is a schematic block diagram illustrating an example of an automatic-recovery switch system with an internal watchdog timer, according to some embodiments. It should be appreciated that the system topology in FIG. 1A is an example, and any numbers of computing devices such as servers, switches and network components may be included in the system of FIG. 1A.

As shown in FIG. 1A, an automatic-recovery switch system can include Network Switch 102 operable to provide the switching function for a network system. Network Switch 102 can include CPU 106 that is operable to execute runtime applications such as implementing network protocols. Examples of such network protocols include Link Aggregation Control Protocol (LACP) and Open Shortest Path First (OSPF), which can facilitate providing a high-speed backbone network such as internet protocol version 4 (IPv4) or internet protocol version 6 (IPv6). For example, LACP is operable to aggregate several physical ports together to form a single logical channel. LACP can allow a network device to negotiate an automatic bundling of links. For example, OSPF is operable to create a topology map of the network by gathering link state information. CPU 106 can execute other network protocols for implementing switching functions as well.

According to some embodiments, CPU 106 can be interconnected with ASIC 108 via a system bus 116 such as PCIe Link (peripheral component interconnect express). ASIC 108 can be a switch IC that can include a switch controller, a memory, and I/O interfaces (not shown). According to some embodiments, ASIC 108 can be associated with ASIC Setting 124 such as lookup tables that can associate a port with a corresponding medium access control (MAC) address. For example, the switch controller can determine a forwarding path of a packet by identifying a destination MAC address in a packet header. It can further associate the destination MAC address with a corresponding output port. Further, ASIC 108 can transmit packets to the network by an uplink such as Ethernet 126.

According to some embodiments, Network Switch 102 can include Memory 104 operable to store switching-related data. Memory 104, for example, can be a dual in-line memory module (DIMM) that can include a group of dynamic random-access memory. Memory technology is well known by those skilled in the art so that further description thereof is unnecessary.

According to some embodiments, CPU 106 can execute ASIC Module 122 and generate ASIC Module Database 118 that can be stored in Memory 104. ASIC Module Database 118 can store various network parameters, for example, mapping of ASIC Setting 124 for network functions.

According to some embodiments, Network Switch 102 can further include a group of ports such as Port 110, Port 112 and Port 114, each of which can be associated with a network device, e.g., a computing node. Additionally, one or more of these ports can be input ports or output ports for packet switching.

As shown in FIG. 1, according to some embodiments, WDT 120 (watchdog timer) can be an internal electronic device that is embedded in CPU 106. WDT 120 can detect system malfunctions such as CPU lock-up or freeze and, consequently, initiate a reset of CPU 106 for system recovery. According to some embodiments, WDT 120 can include a counter that can count down from an initial value (e.g., 60 seconds) to zero. At the expiration of the initial value, WDT 120 can send a timeout signal that can reset CPU 106 for system recovery. According to some embodiments, the counter of WDT 120 can count up from an initial value to an overflow value. Similarly, WDT 120 can send a timeout signal to reset CPU 106 when the counter reaches the overflow value.

According to some embodiments, WDT 120 can be configured with more than one counter, each of which can correspond to a respective operation stage of Network Switch 102. Also, depending on the characteristic and functions of each respective operation stage, an initial value of each counter can be different. For example, a first watchdog timer counter can be associated with a boot loader stage. The first watchdog timer counter can have an initial time value longer than an estimated time for the boot loader stage. For example, a second watchdog timer counter can be associated with an operation system booting stage. The second watchdog timer counter can have an initial time value longer than an estimated time for the operation system booting stage. For example, a third watchdog timer counter can be associated with a runtime stage. Further, as the runtime stage can be indefinite, the third watchdog timer can be periodically reset by a timer resetting program or a watchdog timer daemon.

More specifically, during a boot loader stage, a boot loader executing on CPU 106 can set a first watchdog counter for WDT 120. According to some embodiments, the first watchdog counter can be set based on an expected time for the boot loader stage. Particularly, the first watchdog counter can be long enough to cover the expected time for the boot loader stage. For example, as the boot loader stage can take no less than 10 seconds, the first watchdog counter can be set to an initial value that is longer than 10 second. This approach can avoid unintentional reset of the booting process while allowing WDT 120 to automatic detect and recover system malfunctions.

Further, when CPU 106 hangs or fails to response to inputs for a period of time that is longer than the first watchdog counter, WDT 120 can transmit a timeout signal to CPU 106 to reset the booting process.

Similarly, during an operation system booting stage, a second watchdog counter can be set for WDT 120. According to some embodiments, the second watchdog counter can be set based on an expected time for the operation system booting stage. Particularly, the second watchdog counter can be long enough to cover the expected time for the operation system booting stage. For example, as the operation system booting stag can typically take no less than 15 seconds, the second watchdog counter can be set to an initial value that is longer than 15 second to avoid unintentional reset of CPU 106.

Further, when CPU 106 hangs or fails to response to inputs for a period of time that is longer than the second watchdog counter, WDT 120 can transmit a timeout signal to reset CPU 106.

During a runtime stage following the boot loader stage and the operation booting stage, a watchdog timer daemon, executing on CPU 106, can set a third watchdog counter for WDT 120. According to some embodiments, a watchdog timer daemon can be a computer program executed as a background process. When CPU 106 functions normally, CPU 106 can generate a heartbeat signal and transmit it using the watchdog timer daemon. Consequently, the watchdog timer daemon can automatically and periodically reset the third watchdog counter to its initial value to avoid a reset of CPU 106. On the other hand, when CPU 106 experiences failures and ceases to generate a heartbeat signal, the watchdog timer daemon can cancel the reset, thus allowing the third watchdog timer to elapse or expire. Accordingly, the watchdog timer can generate a timeout signal to reset CPU 106.

Further, WDT 120 can be configured with additional watchdog timer counters for other booting or operating stage of the network system.

According to some embodiments, a reset of the network system can further include a warm boot initialization of ASIC 108. Unlike a cold boot initiation process that can cause network downtime, a warm boot initiation process can reserve the switching function during a CPU reset. For example, switching functions such as learning and forwarding performed by ASIC 108 can continue during the CPU reboot.

In a warm boot initiation process, ASIC Module 122 can start a warm boot initiation as it received the timeout signal from WDT 120 or another component. ASIC Module 122 can probe PCIe devices that are connected to system bus 116, during which it can identify ASIC 108. Then ASIC Module 122 can receive ASIC Setting 124 from ASIC 108. Consequently, ASIC Module 122 can reload various device modules or drivers, including MAC drivers for related ports. ASIC Module 122 can also rebuild ASIC Module Database 118 using ASIC Setting 124. Eventually, the network system can establish network protocols according to ASIC Module Database 118. Examples of such network protocols can include LACP and OSPF, as described herein.

Figure 1B:
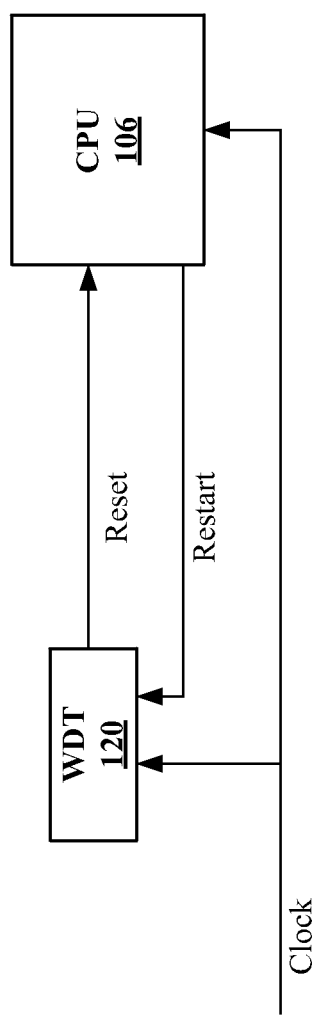
FIG. 1B is a schematic block diagram illustrating another example of the automatic-recovery switch system with an internal watchdog timer, as illustrated I FIG. 1A.

FIG. 1B is a schematic block diagram illustrating another example of the automatic-recovery switch system as illustrated in FIG. 1A. According to some embodiments, when the network system enters a runtime stage, CPU 106 can automatically send restart signals to WDT 120 so that it will not send a reset signal to CPU 106. For example, WDT 120 can be associated with a watchdog counter value of 5 seconds during the runtime stage. Accordingly, CPU 106 can periodically and automatically send a restart signal to WDT 120 within every 5 seconds. According to some embodiments, a watchdog timer daemon executing on CPU 106 can periodically send a restart signal to WDT 120. When CPU fails to send restart signals, WDT 120, at the expiration of 5 seconds, can send a reset signal to CPU 106. Upon receiving the reset signal, the network system can force a restart of a booting process so that it can recover from the CPU lock-up or freeze.

Figure 2:
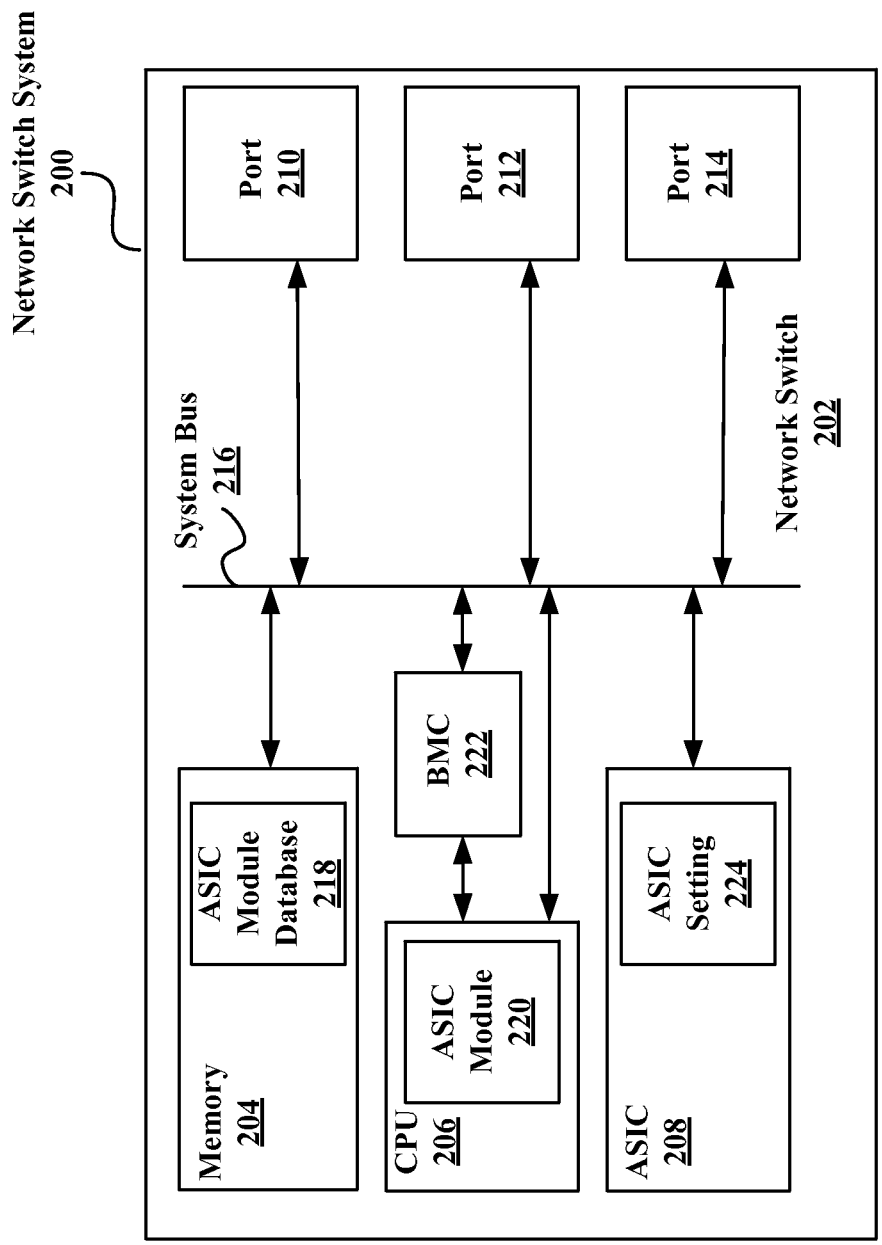
FIG. 2 is a schematic block diagram illustrating an example of an automatic-recovery switch system with an external watchdog timer, according to some embodiments.

FIG. 2 is a schematic block diagram illustrating an example of an automatic-recovery switch system with an external watchdog timer, according to some embodiments. It should be appreciated that the system topology in FIG. 2 is an example, and any numbers of computing devices such as servers, switches and network components may be included in the system of FIG. 2.

As shown in FIG. 2, an automatic-recovery switch system can include Network Switch 202 operable to provide the switching function for a network system. Network Switch 202 can include CPU 206 that is operable to execute runtime applications such as implementing network protocols. Examples of such network protocols include Link Aggregation Control Protocol (LACP) and Open Shortest Path First (OSPF), which can facilitate providing a high-speed backbone network such as Internet Protocol version 4 (IPv4) or Internet Protocol version 6 (IPv6). For example, LACP is operable to aggregate several physical ports together to form a single logical channel. LACP can allow a network device to negotiate an automatic bundling of links. For example, OSPF is operable to create a topology map of the network by gathering link state information. CPU 206 can execute other network protocols for implementing switching functions as well.

According to some embodiments, CPU 206 can interconnect with ASIC 208 via a system bus 216 such as PCIe Link (peripheral component interconnect express). CPU 206 can interconnect with Baseboard Management Controller (BMC) 222 that is operable to simulate functions of a watchdog timer via a communication interface. An example of such a communication interface is Intelligent Platform Management Bus/Bridge (IPMB), which can define the protocols for interfacing with a service processor embedded in a computing device. Another example of the communication interface can be a RESTful (Representational State Transfer) interface such as Redfish. Another example of the communication interface can be an i2c (Inter-Integrated Circuit). Another example of the communication interface can be a SMBus system interface (SSIF).

A BMC is an independent and embedded microcontroller that, in some embodiments, is responsible for the management and monitoring of the main CPU, firmware and operating system. According to some embodiments, a BMC can monitor the server's hardware components by receiving data from sensors installed in the chassis, e.g., fan speeds, CPU temperature, power consumption level, etc. According to some embodiments, a Rack Management Controller (RMC) or a Chassis Management Controller (CMC) can be operable to provide watchdog timer functions to the network system.

According to some embodiments, BMC 222 can be coupled to Network Switch 202 via a communication link such as I²C. According to some embodiments, BMC 222 can be connected to general-purpose input/output (GPIO) pins of Network Switch 202 via the communication link.

According to some embodiments, ASIC 208 can be associated with ASIC Setting 224 such as lookup tables that can associate a port with a corresponding medium access control (MAC) address. For example, the switch controller can determine a forwarding path of a packet by identifying a destination MAC address in a packet header. It can further associate the destination MAC address with a corresponding output port.

According to some embodiments, Network Switch 202 can include Memory 204 operable to switching-related data. Memory 204, for example, can be a dual in-line memory module (DIMM) that can include a group of dynamic random-access memory. Memory technology is well known by those skilled in the art so that further description thereof is unnecessary.

According to some embodiments, CPU 206 can execute ASIC Module 220 and generate ASIC Module Database 218 that can be stored in Memory 204. ASIC Module Database 218 can store various network parameters, for example, mapping of ASIC Setting 224 for network functions.

According to some embodiments, Network Switch 202 can further include a group of ports such as Port 210, Port 212 and Port 214, each of which can be associated with a network device, e.g., a computing node. Additionally, one or more of these ports can be input ports or output ports for packet switching.

As shown in FIG. 2, according to some embodiments, BMC 222 can be an independent device that is external CPU 206. BMC 222 can detect system malfunctions such as CPU lock-up or freeze and, consequently, initiate a reset of CPU 206 for system recovery. For example, BMC 222 can send GPIO signals to CPU 206 to initiate a reset. According to some embodiments, BMC 222 can function as a counter that can count down from an initial value (e.g., 60 seconds) to zero. At the expiration of the initial value, BMC 222 can send a timeout signal that can reset CPU 206 for system recovery. According to some embodiments, BMC 222 can count up from an initial value to an overflow value. Similarly, BMC 222 can send a timeout signal to reset CPU 206 when the counter reaches an overflow value that is predetermined.

According to some embodiments, BMC 222 can be configured with more than one counter, each of which can correspond to a respective operation stage of Network Switch 202. Also, depending on the characteristic and functions of each respective operation stage, an initial value of each counter can be different. For example, a first watchdog timer counter can be associated with a boot loader stage. The first watchdog timer counter can have an initial time value longer than an estimated time for the boot loader stage. For example, a second watchdog timer counter can be associated with an operation system booting stage. The second watchdog timer counter can have an initial time value longer than an estimated time for the operation system booting stage. For example, a third watchdog timer counter can be associated with a runtime stage. Further, as the runtime stage can be indefinite, the third watchdog timer can be periodically reset by a timer resetting program or a watchdog timer daemon.

More specifically, during a boot loader stage, a boot loader executing on CPU 206 can set a first watchdog counter for BMC 222. For example, via a command or instructions from CPU 206 to BMC 222 via a communication interface. According to some embodiments, the first watchdog counter can be set based on an expected time for the boot loader stage. Particularly, the first watchdog counter can be long enough to cover the expected time for the boot loader stage to avoid an undesired system reset. For example, as the boot loader stage can take no less than 10 seconds, the first watchdog counter can be set to an initial value that is longer than 10 second. This approach can avoid unintentional reset of the booting process while allowing BMC 222 to automatic detect and recover system malfunctions.

Further, when CPU 206 hangs or fails to response to inputs for a period of time that is longer than the first watchdog counter (e.g., 10 seconds), BMC 222 can transmit a timeout signal to CPU 206 to reset the booting process. An example of the timeout signals can be a GPIO signal.

Similarly, during an operation system booting stage, a second watchdog counter can be set for BMC 222. According to some embodiments, the second watchdog counter can be set based on an expected time for the operation system booting stage. Particularly, the second watchdog counter can be long enough to cover the expected time for the operation system booting stage. For example, as the operation system booting stag can typically take no less than 15 seconds, the second watchdog counter can be set to an initial value that is longer than 15 second to avoid unintentional reset of CPU 206.

Further, when CPU 206 hangs or fails to response to inputs for a period of time that is longer than the second watchdog counter (e.g. 15 seconds), watchdog daemon can transmit a timeout signal to reset CPU 206.

During a runtime stage following the boot loader stage and the operation booting stage, a watchdog timer daemon, executing on CPU 206, can set a third watchdog counter for BMC 222. According to some embodiments, a watchdog timer daemon can be a computer program executed as a background process. When CPU 206 functions normally, CPU 206 can generate a heartbeat signal and transmit it using the watchdog timer daemon. Consequently, the watchdog timer daemon can automatically and periodically reset the third watchdog counter to its initial value to avoid a reset of CPU 206. On the other hand, when CPU 206 experiences failures and ceases to generate a heartbeat signal, the watchdog timer daemon can cancel the reset, thus allowing the third watchdog timer to elapse or expire. Accordingly, the watchdog timer can generate a timeout signal to reset CPU 206.

Further, watchdog daemon can be configured with additional watchdog timers for other booting or operating stage of the network system.

According to some embodiments, a reset of the network system can further initiate a warm boot initialization of ASIC 208. Unlike a cold boot initiation process that can cause network downtime, a warm boot initiation process can reserve the switching function during a CPU reset. For example, switching functions such as learning and forwarding performed by ASIC 208. In a warm boot initiation process, the network system can receive ASIC Setting 224 from ASIC 208, reload ASIC Module 220 to execute on CPU 206 and rebuild ASIC Module Database 218 in Memory 204 based on ASIC Setting 224. Eventually, the network system can establish network protocols according to ASIC Module Database 218. Examples of such network protocols can include LACP and OSPF, as described herein.

Figure 3:
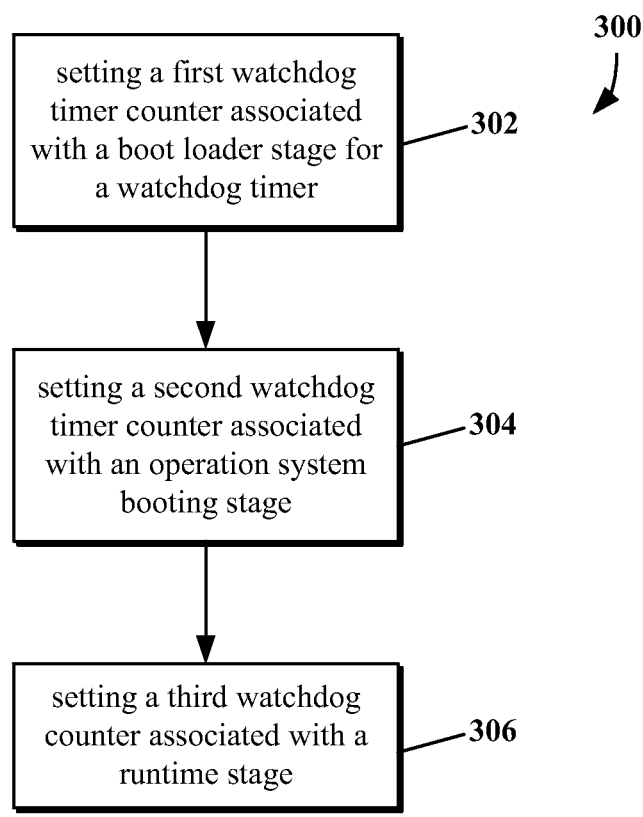
FIG. 3 is an example flow diagram for an automatic-recovery switch system, according to some embodiments.

FIG. 3 is an example flow diagram for an automatic-recovery switch system, according to some embodiments. It should be understood that there can be additional, fewer, or alternative steps performed in similar or alternative orders, or in parallel, within the scope of the various embodiments unless otherwise stated.

At step 302, the automatic-recovery switch system can set a first watchdog timer counter of a watchdog timer. According to some embodiments, a watchdog timer can be an electronic timer that is internal to a switch CPU. According to some embodiments, an initial value of the first watchdog timer counter can be determined based at least in part on an expected length of time for a boot loader stage. Further, the watchdog timer can send a timeout signal to reset a switch central processor unit after expiration of the first watch dog timer counter.

For example, as shown in FIG. 1, a boot loader executing on CPU 106 can set a first watchdog counter for WDT 120. Particularly, the first watchdog counter can be long enough to cover the expected time for the boot loader stage. For example, as the boot loader stage can take no less than 10 seconds, the first watchdog counter can be set to an initial value that is longer than 10 second. This approach can avoid unintentional reset of the booting process while allowing WDT 120 to automatic detect and recover system malfunctions.

At step 304, the automatic-recovery switch system can set a second watchdog timer counter of the watchdog timer. According to some embodiments, an initial value of the first watchdog timer counter can be determined based at least in part on an expected length of time for an operation system booting stage. Further, the watchdog timer can send a timeout signal to reset a switch central processor unit after expiration of the second watch dog timer counter.

For example, as shown in FIG. 1, a first watchdog counter can be set for WDT 120. According to some embodiments, the second watchdog counter can be set based on an expected length of time for the operation system booting stage. Particularly, the second watchdog counter can be long enough to cover the expected time for the operation system booting stage. For example, as the operation system booting stag can typically take no less than 15 seconds, the first watchdog counter can be set to an initial value that is longer than 15 second to avoid unintentional reset of CPU 106.

At step 306, the automatic-recovery switch system can set a third watchdog counter of the watchdog timer. According to some embodiments, the third watchdog timer counter can be associated with a runtime stage. The watchdog timer can send a timeout signal to reset a switch central processor unit after expiration of the third watch dog timer counter. According to some embodiments, the third watchdog timer can be periodically reset by a watchdog timer daemon to prevent expiration of the third watchdog timer.

Still referring to FIG. 1, for example, a watchdog timer daemon, executing on CPU 106, can set a third watchdog counter for WDT 120 during a runtime stage following the boot loader stage and the operation booting stage. According to some embodiments, a watchdog timer daemon can be a computer program executed as a background process. When CPU 106 functions normally, CPU 106 can generate a heartbeat signal and transmit it using the watchdog daemon. Consequently, the watchdog timer daemon can automatically and periodically reset the third watchdog counter to its initial value to avoid a reset of CPU 106. On the other hand, when CPU 106 experiences failures and ceases to generate a heartbeat signal, the watchdog timer daemon can forgo the rest and allow the third watchdog timer to elapse or expire. Accordingly, the watchdog timer can generate a timeout signal to reset CPU 106.

Figure 4:
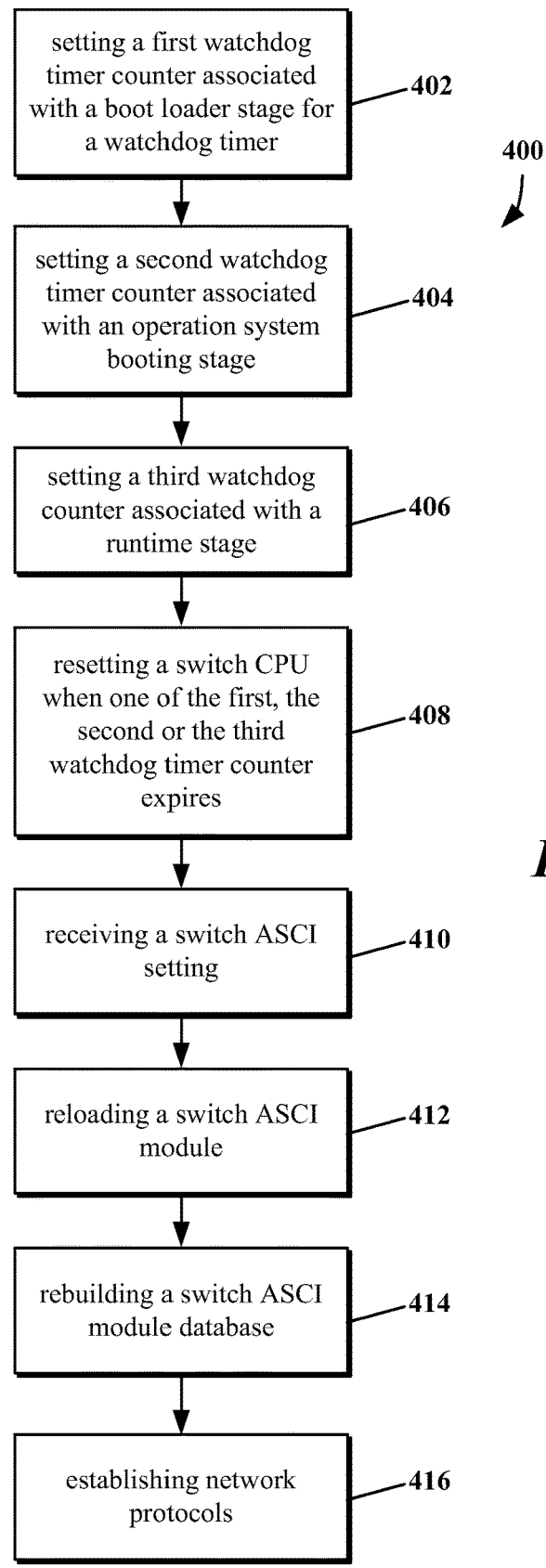
FIG. 4 is another example flow diagram for an automatic-recovery switch system with switching function high-availability, according to some embodiments.

FIG. 4 is another example flow diagram for an automatic-recovery switch system with switching function high-availability, according to some embodiments. It should be understood that there can be additional, fewer, or alternative steps performed in similar or alternative orders, or in parallel, within the scope of the various embodiments unless otherwise stated.

At step 402, the automatic-recovery switch system can set a first watchdog timer counter of a watchdog timer. According to some embodiments, a service controller, e.g, a BMC, which is independent from a switch CPU, can simulate functions of an electronic watchdog timer. According to some embodiments, an initial value of the first watchdog timer counter can be determined based at least in part on an expected length of time for a boot loader stage. Further, the watchdog timer can send a timeout signal to reset a switch central processor unit after expiration of the first watch dog timer counter.

For example, as shown in FIG. 2, a boot loader executing on CPU 206 can set a first watchdog counter for BMC 222. Particularly, the first watchdog counter can be long enough to cover the expected time for the boot loader stage. For example, as the boot loader stage can take no less than 10 seconds, the first watchdog counter can be set to an initial value that is longer than 10 second. This approach can avoid unintentional reset of the booting process while allowing BMC 222 to automatic detect and recover system malfunctions.

At step 404, the automatic-recovery switch system can set a second watchdog timer counter of the watchdog timer. According to some embodiments, an initial value of the first watchdog timer counter can be determined based at least in part on an expected length of time for an operation system booting stage. Further, the watchdog timer can send a timeout signal to reset a switch central processor unit after expiration of the second watch dog timer counter.

For example, as shown in FIG. 2, a first watchdog counter can be set for BMC 222. According to some embodiments, the second watchdog counter can be set based on an expected length of time for the operation system booting stage. Particularly, the second watchdog counter can be long enough to cover the expected time for the operation system booting stage. For example, as the operation system booting stag can typically take no less than 15 seconds, the first watchdog counter can be set to an initial value that is longer than 15 second to avoid unintentional reset of CPU 206.

At step 406, the automatic-recovery switch system can set a third watchdog counter of the watchdog timer. According to some embodiments, the third watchdog timer counter can be associated with a runtime stage. The watchdog timer can send a timeout signal to reset a switch central processor unit after expiration of the third watchdog timer counter. According to some embodiments, the third watchdog timer can be periodically reset by a watchdog timer daemon to prevent expiration of the third watchdog timer.

Still referring to FIG. 2, for example, a watchdog timer daemon, executing on CPU 206, can set a third watchdog counter for BMC 222 during a runtime stage following the boot loader stage and the operation booting stage. According to some embodiments, a watchdog timer daemon can be a computer program executed as a background process. When CPU 206 functions normally, CPU 206 can generate a heartbeat signal and transmit it using the watchdog daemon. Consequently, the watchdog timer daemon can automatically and periodically reset the third watchdog counter to its initial value to avoid a reset of CPU 206. On the other hand, when CPU 206 experiences failures and ceases to generate a heartbeat signal, the watchdog timer daemon can forgo the rest and allow the third watchdog timer to elapse or expire. Accordingly, the watchdog timer can generate a timeout signal to reset CPU 206.

At step 408, when one of the first watchdog timer counter, the second watchdog timer counter, or the third watchdog timer counter expires, the watchdog timer can reset a switch CPU so that it can recover from malfunctions. For example, as shown in FIG. 2, during a runtime stage following the boot loader stage and the operation booting stage, a watchdog timer daemon, executing on CPU 206, can set a third watchdog counter for BMC 222. When CPU 206 experiences failures and ceases to generate a heartbeat signal, the watchdog timer daemon can cancel the counter reset, thus allowing the third watchdog timer to elapse or expire. Accordingly, the watchdog timer can generate a timeout signal to reset CPU 206.

At step 410, the automatic-recovery switch system can receive a switch ASIC setting from the switch ASIC. For example, as shown in FIG. 2, Network Switch 202 can receive ASIC setting 224 from ASIC 208 during a warm boot initialization without resetting ASIC 208.

At step 412, the automatic-recovery switch system can reload a switch ASIC module. For example, Network Switch 202 can reload ASIC Module 220 and execute it on CPU 206. ASIC Module 220 can be operable to generate ASIC Module Database 218, which can include parameters for implementing switching functions.

At step 414, the automatic-recovery switch system can rebuild a switch ASIC databased using the ASIC setting. For example, Network Switch can rebuild ASIC Module Database 218 to store in Memory 204. ASIC Module Database 218 can store various network parameters, for example, mapping of ASIC Setting 224 for network functions.

At step 416, the automatic-recovery switch system can establish network protocols using the switch ASIC module database. Examples of such network protocols include Link Aggregation Control Protocol (LACP) and Open Shortest Path First (OSPF), which can facilitate providing a high-speed backbone network such as Internet Protocol version 4 (IPv4) or Internet Protocol version 6 (IPv6). Thus, Network Switch 202 can maintain the high-availability of switching functions while rebooting CPU 206.

Figure 5:
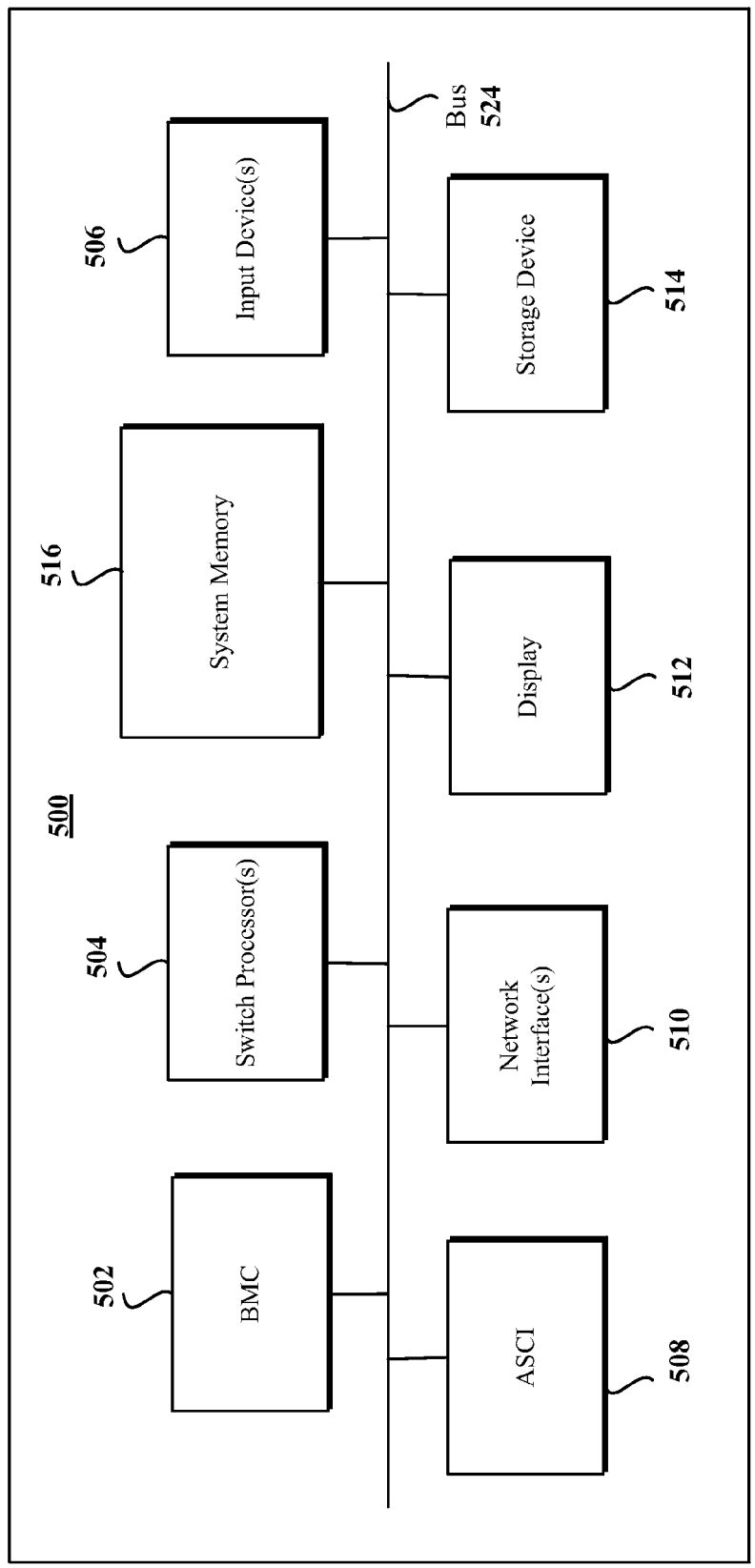
FIG. 5 illustrates a computing platform of a computing device, according to some embodiments.

FIG. 5 illustrates example system architecture 500 for implementing the systems and processes of FIGS. 1-4. Computing platform 500 includes a bus 524 that interconnects subsystems and devices, such as: BMC 502, processor 504, storage device 514, system memory 516, a network interface(s) 510, and ASIC 508. Processor 504 can be implemented with one or more central processing units ("CPUs"), such as those manufactured by Intel® Corporation—or one or more virtual processors—as well as any combination of CPUs and virtual processors. Computing platform 500 exchanges data representing inputs and outputs via input-and-output devices input devices 506 and display 512, including, but not limited to: keyboards, mice, audio inputs (e.g., speech-to-text devices), user interfaces, displays, monitors, cursors, touch-sensitive displays, LCD or LED displays, and other I/O-related devices.

Computer architecture 500 performs specific operations by processor 504, executing one or more sequences of one or more instructions stored in system memory 516. Computing platform 500 can be implemented as a server device or client device in a client-server arrangement, peer-to-peer arrangement, or as any mobile computing device, including smart phones and the like. Such instructions or data may be read into system memory 516 from another computer readable medium, such as storage device 514. In some examples, hard-wired circuitry may be used in place of or in combination with software instructions for implementation. Instructions may be embedded in software or firmware. The term "computer readable medium" refers to any tangible medium that participates in providing instructions to processor 504 for execution. Such a medium may take many forms, including, but not limited to, non-volatile media and volatile media. Non-volatile media includes, for example, optical or magnetic disks and the like. Volatile media includes dynamic memory, such as system memory 516.

Common forms of computer readable media includes, for example: floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read. Instructions may further be transmitted or received using a transmission medium. The term "transmission medium" may include any tangible or intangible medium that is capable of storing, encoding or carrying instructions for execution by the machine, and includes digital or analog communications signals or other intangible medium to facilitate communication of such instructions. Transmission media includes coaxial cables, copper wire, and fiber optics, including wires that include bus 524 for transmitting a computer data signal.

In the example shown, system memory 516 can include various modules that include executable instructions to implement functionalities described herein. In the example shown, system memory 516 includes a log manager, a log buffer, or a log repository—each can be configured to provide one or more functions described herein.

Although the foregoing examples have been described in some detail for purposes of clarity of understanding, the above-described inventive techniques are not limited to the details provided. There are many alternative ways of implementing the above-described invention techniques. The disclosed examples are illustrative and not restrictive.

What is claimed is:

1. A computer-implemented method of booting a switch central processor unit, comprising:
   setting a first watchdog timer counter of a watchdog timer, the first watchdog timer counter being associated with a boot loader stage, the first watchdog timer being operable to reset a switch central processor unit after expiration of the first watch dog timer counter;
   setting a second watchdog timer counter of the watchdog timer, the second watchdog timer counter being associated with an operation system booting stage, the second watchdog timer being operable to reset the switch central processor unit after expiration of the second watch dog timer counter; and
   setting a third watchdog counter of the watchdog timer, the third watchdog timer counter being associated with a runtime stage, the third watchdog timer being operable to reset the switch central processor unit after expiration of the third watch dog timer counter, wherein the third watchdog timer is periodically reset by a watchdog timer daemon to prevent expiration of the third watchdog timer, the watchdog timer daemon being associated with an operation status of a switch central processing unit.

2. The method of claim 1, wherein the first watchdog timer counter is set based on an expected time associated with the boot loader stage.

3. The method of claim 2, wherein the first watchdog timer counter is set to be long enough to cover the expected time associated with the boot loader stage.

4. The method of claim 1, wherein the second watchdog timer counter is set based on an expected time associated with the operation system booting stage.

5. The method of claim 4, wherein the second watchdog timer counter is set to be long enough to cover the expected time associated with the operation system booting stage.

6. The method of claim 1, wherein the watchdog timer is an embedded timer internal to the switch central processing unit.

7. The method of claim 1, wherein the watchdog timer is a service controller external to the switch central processing unit.

8. The method of claim 1, further comprising performing one of:
   resetting, during the boot loader stage, the switch central processing unit after expiration of the first watch dog timer counter;
   resetting, during the operation system booting stage, the switch central processing unit after expiration of the second watch dog timer counter; and
   resetting, during the runtime stage, the switch central processing unit after expiration of the third watch dog timer counter.

9. The method of claim 8, wherein resetting the switch central processing unit further comprises performing a warm boot initialization without resetting a switch application-specific integrated circuit.

10. The method of claim 9, wherein the warm boot initialization further comprises:
   receiving a switch application-specific integrated circuit setting from the switch application-specific integrated circuit;
   reloading a switch application-specific integrated circuit module;
   rebuilding a switch application-specific integrated circuit module database based on the switch application-specific integrated circuit setting; and
   establishing network protocols based at least in part on the switch application-specific integrated circuit module database.

11. A system, comprising:
a processor; and
a memory device comprising instructions that, when executed by the processor, cause the processor to perform instructions comprising:
setting a first watchdog timer counter of a watchdog timer, the first watchdog timer counter being associated with a boot loader stage, the first watchdog timer being operable to reset a switch central processor unit after expiration of the first watch dog timer counter;
setting a second watchdog timer counter of the watchdog timer, the second watchdog timer counter being associated with an operation system booting stage, the second watchdog timer being operable to reset the switch central processor unit after expiration of the second watch dog timer counter; and
setting a third watchdog counter of the watchdog timer, the third watchdog timer counter being associated with a runtime stage, the third watchdog timer being operable to reset the switch central processor unit after expiration of the third watch dog timer counter, wherein the third watchdog timer is periodically reset by a watchdog timer daemon to prevent expiration of the third watchdog timer, the watchdog timer daemon being associated with an operation status of a switch central processing unit.

12. The system of claim 11, wherein the first watchdog timer counter is set to be long enough to cover an expected time associated with the boot loader stage.

13. The system of claim 11, wherein the second watchdog timer counter is set to be long enough to cover an expected time associated with the operation system booting stage.

14. The system of claim 11, wherein the memory device comprising instructions that cause the processor to further perform instructions comprising:
   resetting, during the boot loader stage, the switch central processing unit after expiration of the first watch dog timer counter;
   resetting, during the operation system booting stage, the switch central processing unit after expiration of the second watch dog timer counter; and
   resetting, during the runtime stage, the switch central processing unit after expiration of the third watch dog timer counter.

15. The system of claim 11, wherein resetting the switch central processing unit further comprises performing a warm boot initialization without resetting a switch application-specific integrated circuit.

16. A non-transitory computer-readable storage medium storing instructions, which, when executed by a processor, cause the processor to perform at least one of operations comprising:
setting a first watchdog timer counter of a watchdog timer, the first watchdog timer counter being associated with a boot loader stage, the first watchdog timer being operable to reset a switch central processor unit after expiration of the first watch dog timer counter;
setting a second watchdog timer counter of the watchdog timer, the second watchdog timer counter being associated with an operation system booting stage, the second watchdog timer being operable to reset the switch central processor unit after expiration of the second watch dog timer counter; and
setting a third watchdog counter of the watchdog timer, the third watchdog timer counter being associated with a runtime stage, the third watchdog timer being operable to reset the switch central processor unit after expiration of the third watch dog timer counter, wherein the third watchdog timer is periodically reset by a watchdog timer daemon to prevent expiration of the third watchdog timer, the watchdog timer daemon being associated with an operation status of a switch central processing unit.

17. The non-transitory computer-readable storage medium of claim 16, which cause the processor to further perform at least one of operations comprising:
   resetting, during the boot loader stage, the switch central processing unit after expiration of the first watch dog timer counter;
   resetting, during the operation system booting stage, the switch central processing unit after expiration of the second watch dog timer counter; and resetting, during the runtime stage, the switch central processing unit after expiration of the third watch dog timer counter.

18. The non-transitory computer-readable storage medium of claim 16, wherein resetting the switch central processing unit further comprises performing a warm boot initialization without resetting a switch application-specific integrated circuit.

19. The non-transitory computer-readable storage medium of claim 16, wherein the first watchdog timer counter is set based on an expected time associated with the boot loader stage.

20. The non-transitory computer-readable storage medium of claim 16, wherein the first watchdog timer counter is set to be long enough to cover the expected time associated with the boot loader stage.

* * * * *